United States Patent
Huang

(10) Patent No.: US 9,103,998 B2
(45) Date of Patent: Aug. 11, 2015

(54) OPTICAL FIBER CONNECTOR

(71) Applicant: HON HAI PRECISION INDUSTRY CO., LTD., New Taipei (TW)

(72) Inventor: Po-Wei Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/098,553

(22) Filed: Dec. 6, 2013

(65) Prior Publication Data

US 2015/0030287 A1   Jan. 29, 2015

(30) Foreign Application Priority Data

Jul. 25, 2013   (TW) .............................. 102126624 U

(51) Int. Cl.
  *G02B 6/42*   (2006.01)
(52) U.S. Cl.
  CPC .............. *G02B 6/4256* (2013.01); *G02B 6/423* (2013.01); *G02B 6/4206* (2013.01); *G02B 6/4228* (2013.01); *G02B 6/4285* (2013.01)
(58) Field of Classification Search
  CPC .... G02B 6/4206; G02B 6/4228; G02B 6/423; G02B 6/4256; G02B 6/4285; G02B 6/43
  USPC ................. 385/31, 33, 38, 39, 50, 52, 53, 55, 385/58–61, 70–79, 134–135
  See application file for complete search history.

(56) References Cited

U.S. PATENT DOCUMENTS 5,123,073 A * 6/1992 Pimpinella .................... 385/59

* cited by examiner

*Primary Examiner* — Akm Enayet Ullah
*Assistant Examiner* — Michael Mooney
(74) *Attorney, Agent, or Firm* — Novak Druce Connolly Bove + Quigg LLP

(57) ABSTRACT

An optical connector includes a first optical-electric coupling element and a second optical-electric coupling element. The first optical-electric coupling element includes a first side surface and a second side surface facing away from the first side surface. The first optical-electric coupling element includes two extension portions substantially perpendicularly extending from the first side surface. Each extension portion includes an inside surface substantially perpendicular to the first side surface. Each extension portion includes a rotation post substantially perpendicularly extending from the inside surface. The second optical-electric coupling element includes a third side surface. The second optical-electric coupling element includes a protrusion portion substantially perpendicularly extending from the third side surface. The protrusion portion includes two outside surfaces substantially perpendicular to the third side surface. Each outside surface defines a rotation hole spatially corresponding to a respective one of rotation posts, the rotation posts are inserted into the rotation holes.

11 Claims, 3 Drawing Sheets

OPTICAL FIBER CONNECTOR

BACKGROUND

1. Technical Field

The present disclosure relates to connectors, and particularly to an optical fiber connector.

2. Description of Related Art

An optical connector includes a laser diode for emitting optical signals, a first optical transmission assembly, a second optical transmission assembly coupled with the first optical transmission assembly, and a photo diode. The optical signals emitted from the laser diode enter the first optical transmission assembly, and are transmitted through the second optical transmission assembly to the photo diode, and finally can be converted into electrical signals by the photo diode.

The first optical transmission assembly includes a number of first coupling lenses, and the second optical assembly includes a number of second coupling lenses for coupling the first coupling lenses to allow optimum signal transmittance. The first optical transmission assembly has to be mechanically and precisely engaged and configured with the second optical transmission assembly via a plurality of positioning holes and positioning posts to ensure the lenses are precisely aligned with the optical fibers. However, it is difficult to consistently align the positioning holes and the positioning posts together, which may result in lowered coupling precision between the coupling lenses and the optical fibers, and thus poor optical signals transmittance.

Therefore, it is desirable to provide an optical fiber connector which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
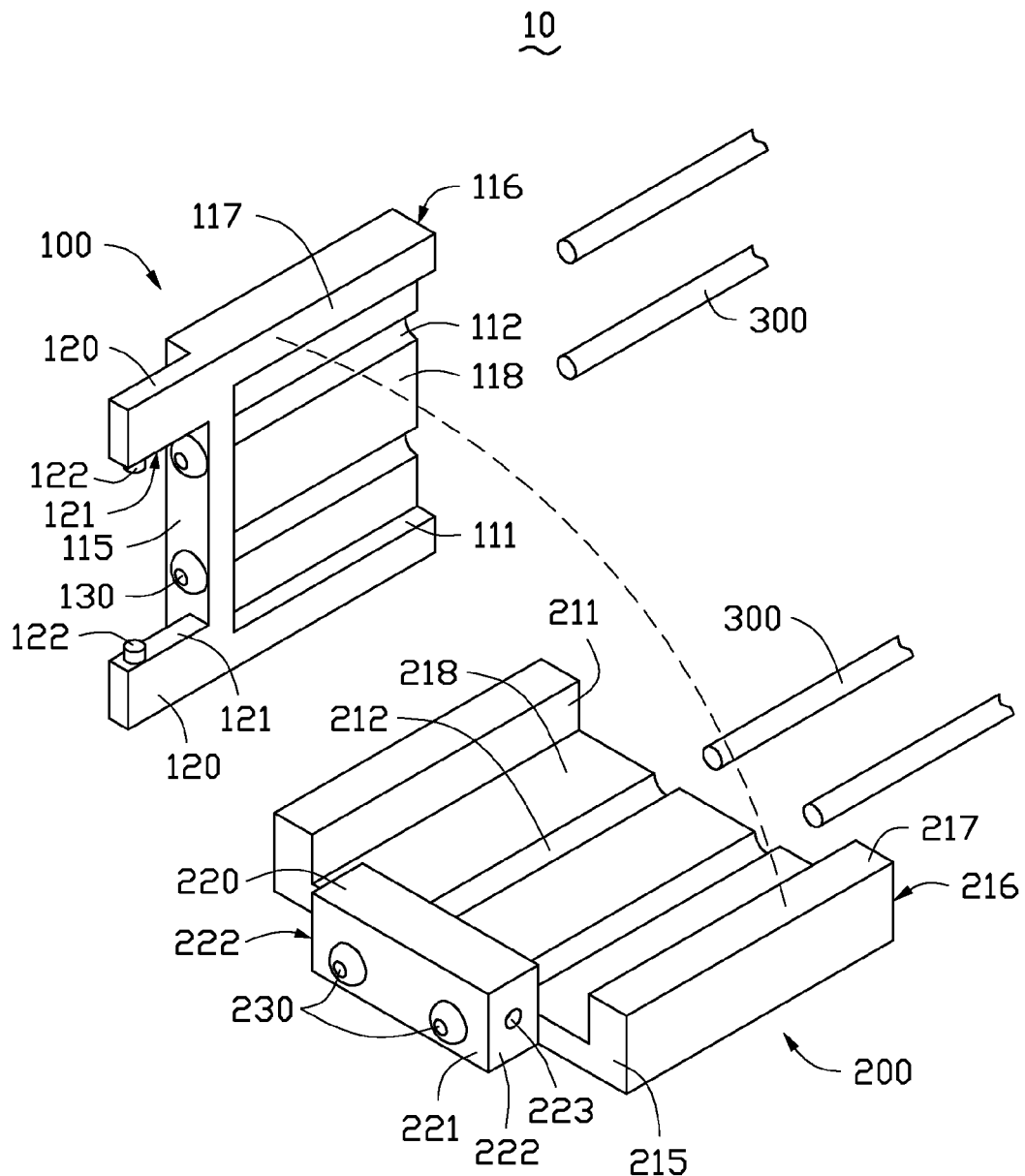
FIG. 1 is an exploded, isometric view of an optical fiber connector, according to an exemplary embodiment.
Figure 2:
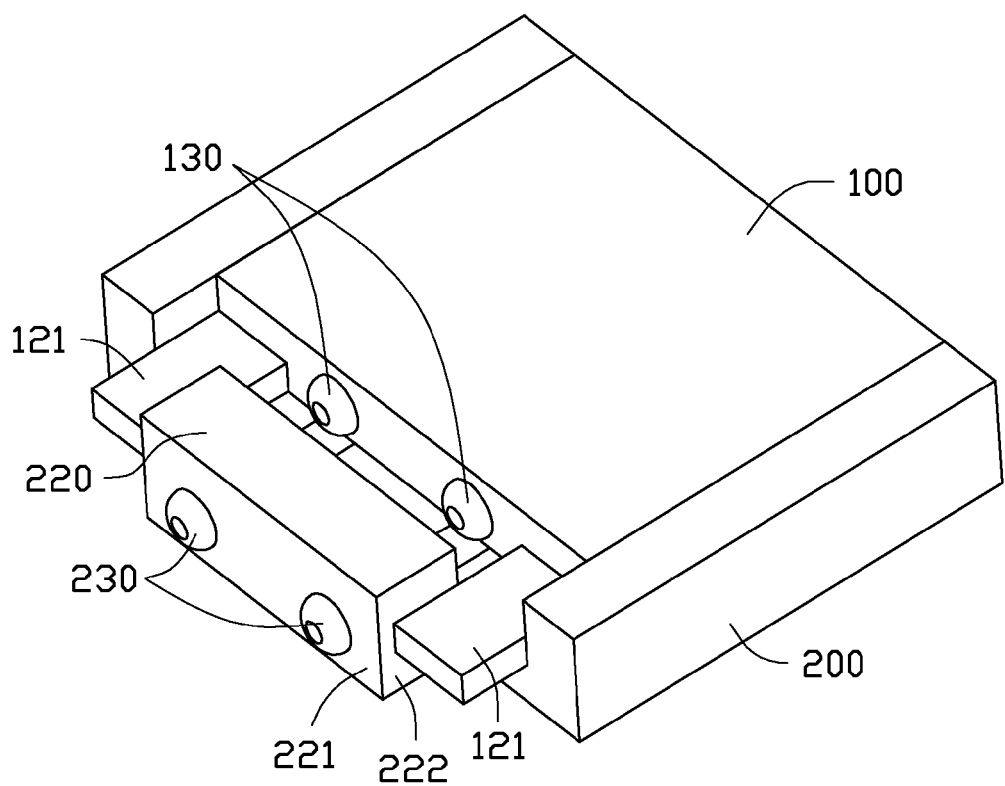
FIG. 2 is an assembled, isometric view of the optical fiber connector of FIG. 1.
Figure 3:
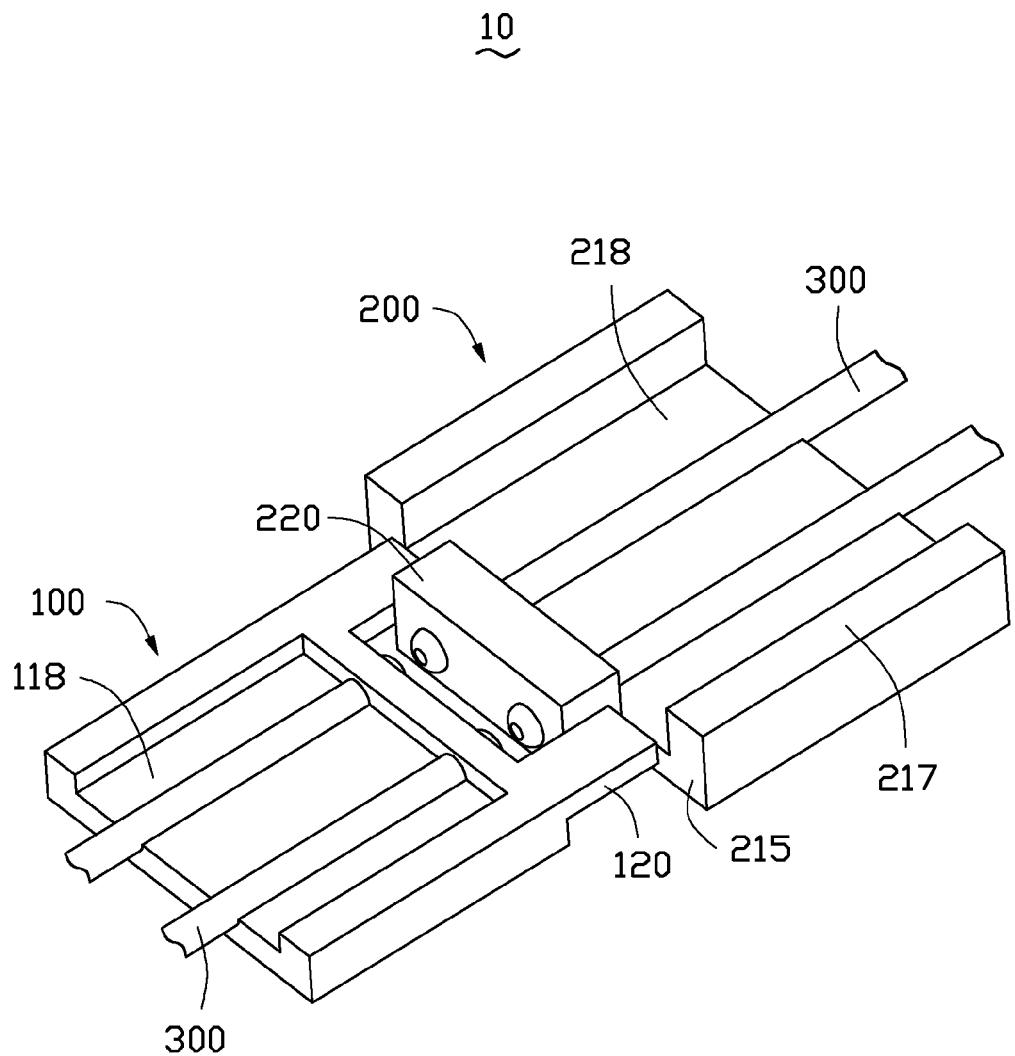
FIG. 3 is similar to FIG. 2, but shown in a use state.

FIGS. 1-3 show an optical fiber connector 10, according to an embodiment. The optical connector 10 includes a first optical-electric coupling element 100, a second optical-electric coupling element 200, and four optical fibers 300 received in the first optical-electric coupling element 100 and the second optical-electric coupling element 200.

The first optical-electric coupling element 100 is made of a transparent material, such as a transparent rubber, and includes a first side surface 115, a second side surface 116 facing away from the first side surface 115, and a first upper surface 117. The first side surface 115 is substantially parallel with the second side surface 116. The first upper surface 117 substantially perpendicularly connects the first side surface 115 to the second side surface 116.

The first optical-electric coupling element 100 includes two extension portions 120 substantially perpendicularly extending upward from the first side surface 115. Each extension portion 120 includes an inside surface 121 substantially perpendicular to the first side surface 115. Each extension portion 120 also includes two rotation posts 122 perpendicularly extending upward from the inside surface 121. In the embodiment, all of the rotation posts 122 are cylindrical.

The first optical-electric coupling element 100 also includes two first coupling lenses 130 formed on the first side surface 115. In the embodiment, all of the first coupling lenses 130 are convex lenses and are integrally formed with the first optical-electric coupling element 100. The two first coupling lenses 130 are located between the two extension portions 120.

The first upper surface 117 defines a first cavity 111. The first cavity 111 runs through the second side surface 116. The first cavity 111 includes a first bottom surface 118. The first bottom surface 118 defines two first semi-cylindrical receiving holes 112. Each first receiving hole 112 aligns with a first coupling lens 130. An axis of the first coupling lens 130 is substantially parallel with a lengthwise direction of the first receiving hole 112. Each first receiving hole 112 is configured to receive an optical fiber 300. In the embodiment, each optical fiber 300 is received in a first receiving hole 112 via an adhesive (not shown).

The second optical-electric coupling element 200 is also made of a transparent material, such as a transparent rubber, and includes a third side surface 215, a fourth side surface 216 facing away from the third side surface 215, and a second upper surface 217. The third side surface 215 is substantially parallel with the fourth side surface 216. The second upper surface 217 substantially perpendicularly connects the third side surface 215 to the fourth side surface 216.

The second optical-electric coupling element 200 includes a protrusion portion 220 substantially perpendicularly extending upward from the third side surface 215. The protrusion portion 220 includes a mounting surface 221 and two outside surface 222. The mounting surface 221 is substantially parallel with the third side surface 215. Each outside surface 222 substantially perpendicularly connects the mounting surface 221 to the third side surface 215. Each outside surface 222 defines a rotation hole 223 spatially corresponding to a rotation post 122. A shape and a size of the rotation hole 223 respectively corresponds to a shape and a size of the rotation post 122, as such, the rotation hole 223 matches with the rotation post 122.

The second optical-electric coupling element 200 also includes two second coupling lenses 230 formed on the mounting surface 221. Each second coupling lens 230 spatially corresponds to the first coupling lens 130. In the embodiment, all of the second coupling lenses 230 are convex lenses and are integrally formed with the protrusion portion 220. In the embodiment, all of the rotation holes 223 are also cylindrical.

The second upper surface 217 defines a second cavity 211. The second cavity 211 runs through the third side surface 215 and the fourth side surface 216. A shape and a size of the second cavity 311 respectively correspond to a shape and a size of the first optical-electric coupling element 100. As such, the second cavity 211 matches with the first optical-electric coupling element 100. In the embodiment, a width of the second cavity 211 is substantially equal to a sum of widths of the two extension portions 120 and a width of the protrusion portion 220, in a direction substantially perpendicular to the outside surface 222.

The second cavity 211 includes a second bottom surface 218. The second bottom surface 218 defines a second semi-cylindrical receiving hole 212. Each second receiving hole 212 aligns with a second coupling lens 230. An axis of the second coupling lens 230 is substantially parallel with a lengthwise direction of the second receiving hole 212. Each second receiving hole 212 is configured to receive an optical fiber 300. In the embodiment, each optical fiber 300 is received in a second receiving hole 212 also via an adhesive.

When assembling, the rotation posts 122 are inserted into the rotation holes 223 to attach the first optical-electric coupling element 100 to the second optical-electric coupling element 200, with each first coupling lens 130 being aligned with a second coupling lens 230.

In use, as the width of the second cavity 211 is substantially equal to the sum of widths of the two extension portions 120 and the width of the protrusion portion 220, the first optical-electric coupling element 100 is rotatably received in the second cavity 211 via the rotation posts 122 and the rotation holes 223. In a first state, the first side surface 115 of the first optical-electric coupling element 100 aligns with the mounting surface 221, that is to say, each first coupling lens 130 aligns with a second coupling lens 230. In a second state, the first optical-electric coupling element 100 is rotated, with respect to the second optical-electric coupling element 200, via the rotation posts 122 and the rotation holes 223, until the first optical-electric coupling element 100 is totally received in the second cavity 211.

In other embodiments, the numbers of the first coupling lenses 130, the second coupling lenses 230 and the optical fibers 300 can be changed depending on need. The numbers of the first receiving hole 112 and the second receiving hole 212 will change correspondingly.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical connector, comprising:
   a first optical-electric coupling element comprising a first side surface and a second side surface facing away from the first side surface, the first optical-electric coupling element comprising two extension portions substantially perpendicularly extending from the first side surface, each extension portion comprising an inside surface substantially perpendicular to the first side surface, each extension portion comprising a rotation post substantially perpendicularly extending from the inside surface; and
   a second optical-electric coupling element comprising a third side surface, the second optical-electric coupling element comprising a protrusion portion substantially perpendicularly extending from the third side surface, the protrusion portion comprising two outside surfaces substantially perpendicular to the third side surface, each outside surface defining a rotation hole spatially corresponding to a respective one of rotation posts, wherein the rotation posts are inserted into the rotation holes to rotatably attach the first optical-electric coupling element to the second optical-electric coupling element.

2. The optical connector of claim 1, wherein the rotation posts and the rotation holes are cylindrical.

3. The optical connector of claim 1, wherein a shape and a size of each of the rotation holes respectively correspond to a shape and a size of each of the rotation posts.

4. The optical connector of claim 1, wherein the first optical-electric coupling element comprises two first coupling lenses formed on the first side surface, the two first coupling lenses are located between the two rotation posts.

5. The optical connector of claim 4, wherein the first optical-electric coupling element is made of a transparent material, the first coupling lenses are convex lenses and are integrally formed with the first optical-electric coupling element.

6. The optical connector of claim 4, comprising two optical fibers, wherein the first optical-electric coupling element comprises a first upper surface substantially perpendicularly connecting the first side surface to the second side surface, the first upper surface defines a first cavity, the first cavity runs through the second side surface, the first cavity comprises a first bottom surface, the first bottom surface defines two first receiving holes each aligning with a respective one of the first coupling lenses, each optical fiber is received in a respective one of the first receiving holes.

7. The optical connector of claim 4, wherein the protrusion portion comprises a mounting surface substantially parallel with the third side surface, the protrusion portion comprises two second coupling lenses formed on the mounting surface, each first coupling lens is aligned with a corresponding second coupling lens.

8. The optical connector of claim 7, wherein the second optical-electric coupling element is made of a transparent material, the second coupling lenses are convex lenses and are integrally formed with the protrusion portion.

9. The optical connector of claim 7, comprising two optical fibers, wherein the second optical-electric coupling element comprises a fourth side surface facing away from the third side surface and a second upper surface substantially perpendicularly connecting the third side surface to the fourth side surface, the second upper surface defines a second cavity matching with the first optical-electric coupling element, the second cavity runs through the third side surface and the fourth side surface, the second cavity comprises a second bottom surface, the second bottom surface defines two second receiving holes, each second receiving hole aligning with a respective one of the second coupling lenses, each optical fiber is received in a respective one of the second receiving holes.

10. The optical connector of claim 9, wherein a shape and a size of the second cavity are respectively corresponding to a shape and a size of the first optical-electric coupling element.

11. The optical connector of claim 9, wherein a width of the second cavity is substantially equal to a sum of widths of the two extension portions and a width of the protrusion portion, in a direction substantially perpendicular to the outside surface.

* * * * *